United States Patent
Kanamarlapudi et al.

(10) Patent No.: US 9,900,232 B2
(45) Date of Patent: Feb. 20, 2018

(54) APPARATUS AND METHOD FOR DYNAMIC USER EQUIPMENT CAPABILITY REPORTING BASED ON DATA ACTIVITY

(71) Applicant: QUALCOMM Incorporated, San Diego, CA (US)

(72) Inventors: Sitaramanjaneyulu Kanamarlapudi, San Diego, CA (US); Rashid Ahmed Akbar Attar, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 14/172,777

(22) Filed: Feb. 4, 2014

(65) Prior Publication Data

US 2014/0376400 A1 Dec. 25, 2014

Related U.S. Application Data

(60) Provisional application No. 61/839,228, filed on Jun. 25, 2013.

(51) Int. Cl.
*H04W 4/00* (2009.01)
*H04L 12/26* (2006.01)
(Continued)

(52) U.S. Cl.
CPC ........ *H04L 43/0888* (2013.01); *H04L 41/022* (2013.01); *H04W 28/0273* (2013.01);
(Continued)

(58) Field of Classification Search
CPC ............. H04L 43/0888; H04L 41/022; H04W 52/0261
See application file for complete search history.

(56) References Cited

U.S. PATENT DOCUMENTS

2008/0227482 A1  9/2008 Lin et al.
2009/0011783 A1  1/2009 Kitazoe
(Continued)

FOREIGN PATENT DOCUMENTS

EP   2574112 A1   3/2013
JP   2003124862 A  4/2003
(Continued)

OTHER PUBLICATIONS

International Search Report and Written Opinion—PCT/US2014/042370—ISA/EPO—Oct. 9, 2014.

*Primary Examiner* — Jutai Kao
(74) *Attorney, Agent, or Firm* — Loza & Loza, LLP

(57) ABSTRACT

Aspects of the disclosure provide an apparatus and methods for dynamic user equipment capability reporting. A user equipment (UE) is configured to communicate with a network utilizing a plurality of communication protocols including a first communication protocol and a second communication protocol. The UE communicates with the network utilizing the first communication protocol with a maximum achievable throughput less than that of the second communication protocol, and the UE dynamically reports a capability of the UE to transfer data utilizing the second communication protocol in consideration of a power efficiency of transferring an amount of data utilizing the first communication protocol or the second communication protocol.

32 Claims, 10 Drawing Sheets

(51) Int. Cl.
*H04W 28/02* (2009.01)
*H04W 52/02* (2009.01)
*H04L 12/24* (2006.01)
*H04W 48/18* (2009.01)
*H04W 80/00* (2009.01)

(52) U.S. Cl.
CPC ........ *H04W 52/0261* (2013.01); *H04W 48/18* (2013.01); *H04W 80/00* (2013.01); *Y02B 60/50* (2013.01)

(56) References Cited

U.S. PATENT DOCUMENTS

| | | | |
|---|---|---|---|
| 2009/0068969 A1 | 3/2009 | Lindoff et al. | |
| 2009/0190500 A1* | 7/2009 | Ji et al. | 370/254 |
| 2010/0062800 A1* | 3/2010 | Gupta | H04W 72/1215 455/552.1 |
| 2011/0055363 A1 | 3/2011 | Kanno et al. | |
| 2011/0080868 A1 | 4/2011 | Krishnaswamy et al. | |
| 2011/0287800 A1* | 11/2011 | Aoyagi | H04W 74/002 455/515 |
| 2011/0319073 A1 | 12/2011 | Ekici et al. | |
| 2012/0060043 A1 | 3/2012 | Kim et al. | |
| 2012/0281558 A1 | 11/2012 | Anderson et al. | |
| 2012/0307700 A1 | 12/2012 | Nordberg et al. | |
| 2013/0005333 A1 | 1/2013 | Chueh et al. | |
| 2013/0121282 A1* | 5/2013 | Liu | 370/329 |
| 2013/0260757 A1* | 10/2013 | Deivasigamani | H04W 24/00 455/435.3 |
| 2014/0099952 A1* | 4/2014 | Bhatnagar et al. | 455/435.2 |

FOREIGN PATENT DOCUMENTS

| | | |
|---|---|---|
| JP | 2011055124 A | 3/2011 |
| WO | WO-2007001215 A1 | 1/2007 |
| WO | WO-2012163028 A1 | 12/2012 |

* cited by examiner

APPARATUS AND METHOD FOR DYNAMIC USER EQUIPMENT CAPABILITY REPORTING BASED ON DATA ACTIVITY

CROSS-REFERENCE TO RELATED APPLICATIONS

This application claims priority to and the benefit of provisional patent application No. 61/839,228 filed in the United States Patent Office on 25 Jun. 2013, the entire content of which is incorporated herein by reference.

TECHNICAL FIELD

Aspects of the present disclosure relate generally to wireless communication systems, and more particularly, to user equipment capability reporting in a wireless communication system.

BACKGROUND

Wireless communication networks are widely deployed to provide various communication services such as telephony, video, data, messaging, broadcasts, video telephony, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Downlink Package Access (HSDPA), High Speed Uplink Package Access (HSUPA), also known as Enhanced Uplink (EUL), and High Speed Packet Access (HSPA), which provide higher data transfer speeds and capacity to associated UMTS networks.

An example of an emerging telecommunication standard is Long Term Evolution (LTE) that is a set of enhancements to the UMTS mobile standard promulgated by 3GPP. It is designed to better support mobile broadband Internet access by improving spectral efficiency, lower costs, improve services, make use of new spectrum, and better integrate with other open standards using orthogonal frequency-division multiple access (OFDMA) on the downlink (DL), single-carrier FDMA (SC-FDMA) on the uplink (UL), and multiple-input multiple-output (MIMO) antenna technology.

A user equipment (UE) with enhanced data communication capability such as HSPA and LTE typically reports its enhanced or best capability to the network whenever enhanced capability is available or supported. However, the UE generally consumes more power when it exchanges data with the network using its enhanced capability, and switching the UE between different communication protocols involves configuration overheads that can lower the UE's energy efficiency.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide apparatuses and methods for dynamic user equipment capability reporting in a first communication protocol or second communication protocol based on data activity. In some aspects of the disclosure, the first communication protocol may be a UMTS Release 99 protocol, and the second communication protocol may be an HSDPA, HSUPA, HSPA, HSPA+, EUL, or LTE protocol.

In one aspect, the disclosure provides a method of wireless communication operable at a user equipment (UE). The UE communicates with a network utilizing a first communication protocol with a maximum achievable throughput less than that of a second communication protocol. Further, the UE dynamically reports a capability to transfer data utilizing the second communication protocol in consideration of an energy efficiency of transferring an amount of data utilizing the first communication protocol or the second communication protocol.

Another aspect of the disclosure provides an apparatus for wireless communication. The apparatus includes means for communicating with a network utilizing a first communication protocol with a maximum achievable throughput less than that of a second communication protocol. The apparatus further includes means for dynamically reporting a capability of the apparatus to transfer data utilizing the second communication protocol in consideration of an energy efficiency of transferring an amount of data utilizing the first communication protocol or the second communication protocol.

Another aspect of the disclosure provides a computer program product including a computer-readable storage medium. The computer-readable storage medium includes code for causing a user equipment (UE) to perform various functions. For example, the code causes the UE to communicate with a network utilizing a first communication protocol with a maximum achievable throughput less than that of a second communication protocol, and the code causes the UE to dynamically report a capability of the UE to transfer data utilizing the second communication protocol in consideration of an energy efficiency of transferring an amount of data utilizing the first communication protocol or the second communication protocol.

Another aspect of the disclosure provides an apparatus for wireless communication. The apparatus includes at least one processor, a communication interface coupled to the at least one processor, and a memory coupled to the at least one processor. The at least one processor includes first circuitry configured to communicate with a network utilizing a first communication protocol with a maximum achievable throughput less than that of a second communication protocol. The at least one processor further include second circuitry configured to dynamically report a capability of the apparatus to transfer data utilizing the second communication protocol in consideration of an energy efficiency of transferring an amount of data utilizing the first communication protocol or the second communication protocol.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure provide an apparatus and methods for dynamic user equipment (UE) access (data communication) capability reporting based on various factors such as data activity, QoS requirement, priority of data, for example. The UE dynamically reports its access capability information to the network so as to transfer data with a desirable power efficiency in consideration of reconfiguration overhead when switching between communication protocols. For example, a UE capable of communicating data in UMTS Release 99 and enhanced data capability (e.g., HSPA or LTE) may initially report its capability being UMTS Release 99 (not UE's best capability) to reduce its power consumption. Then when a certain condition is met with respect to the amount of data activity or the significance of the data, the UE may dynamically report its capability being its enhanced capability. This novel capability reporting approach is different from a typical approach in which a UE reports its best capability whenever it is available.

Figure 1:
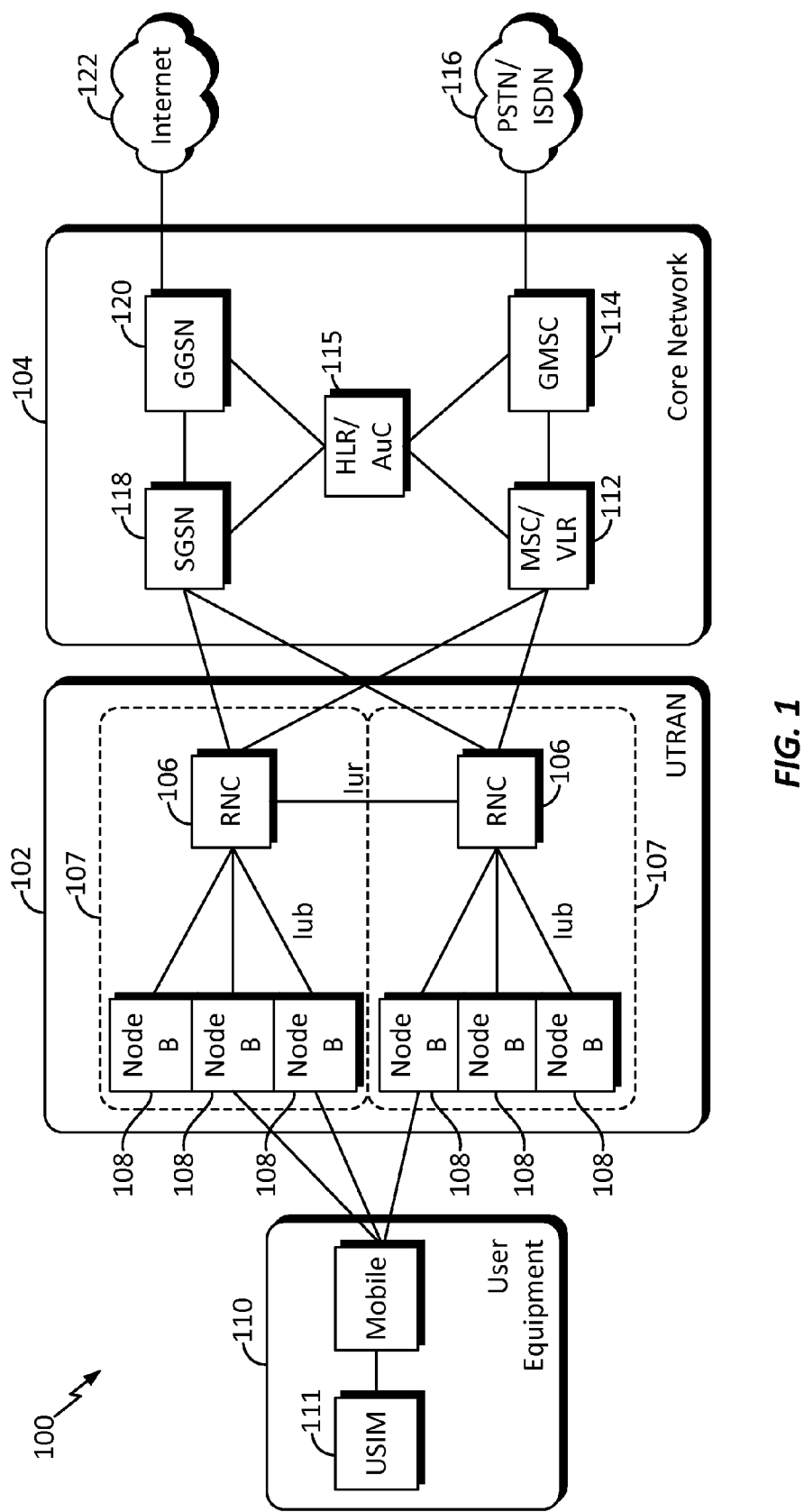
FIG. 1 is a block diagram conceptually illustrating an example of a telecommunications system in accordance with aspects of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. In an aspect, the UE 110 may be implemented using the apparatus 100. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

Figure 2:
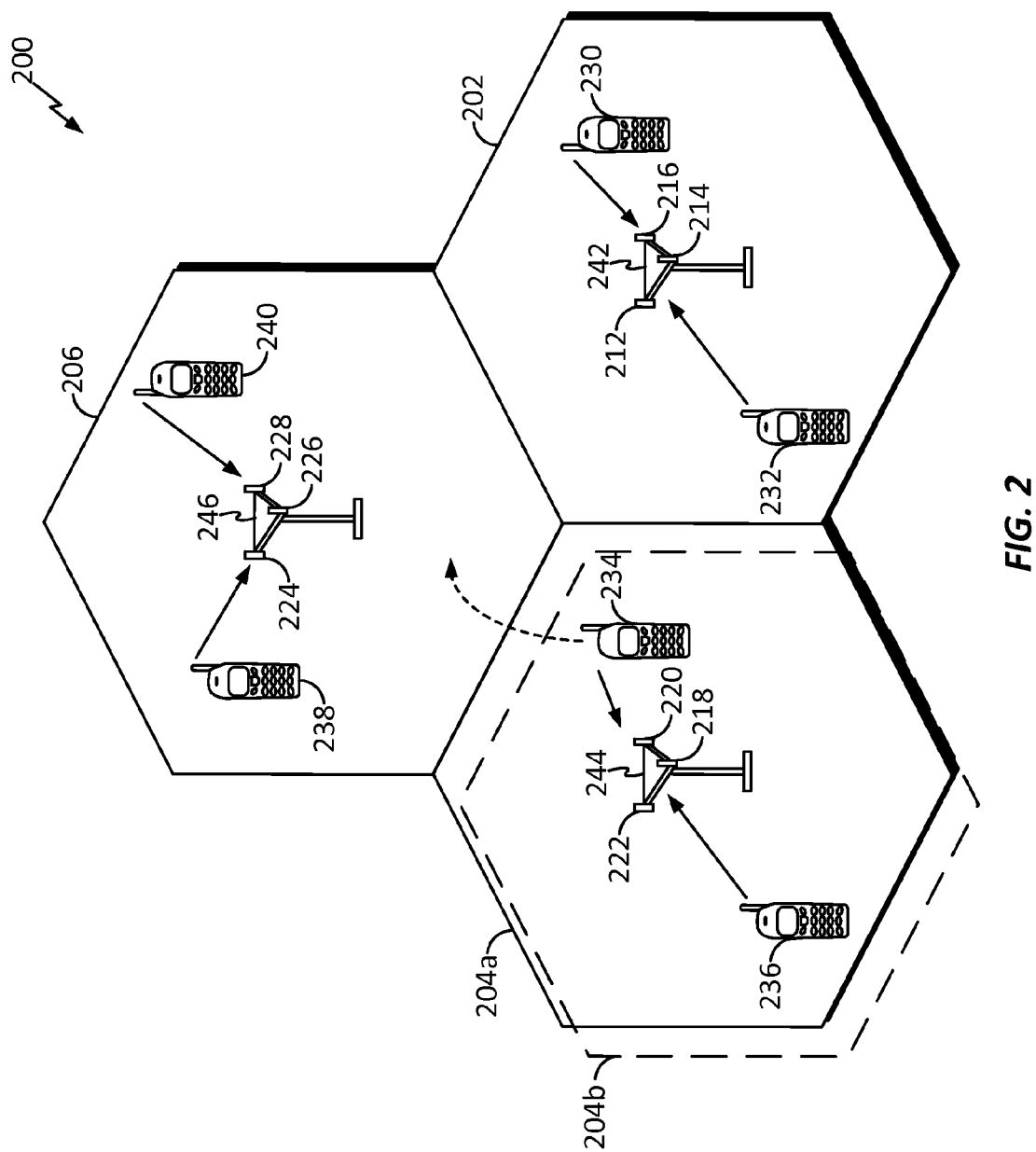
FIG. 2 is a conceptual diagram illustrating an example of a radio access network in accordance with aspects of the disclosure.

The UTRAN 102 is one example of a RAN that may be utilized in accordance with aspects of the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code. In some aspects of the disclosure, the RAN 200 may be an Evolved UMTS Terrestrial Radio Access Network (E-UTRAN) that supports LTE access.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 204 (see FIG. 2) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
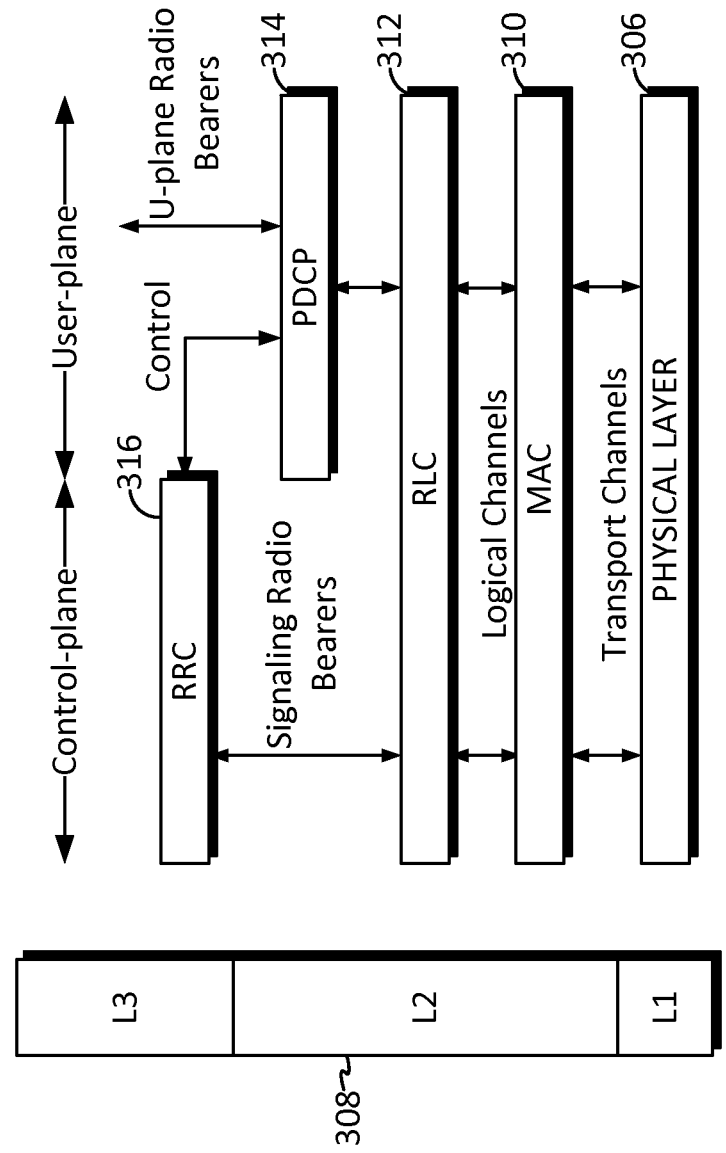
FIG. 3 is a conceptual diagram illustrating an example of a radio protocol architecture for the user and control plane.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 110 and Node B 108 over the physical layer 306.

At Layer 3, the RRC layer 316 handles the control plane signaling between the UE 110 and the Node B 108. RRC layer 316 includes a number of functional entities for reporting UE capabilities, routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

Figure 4:
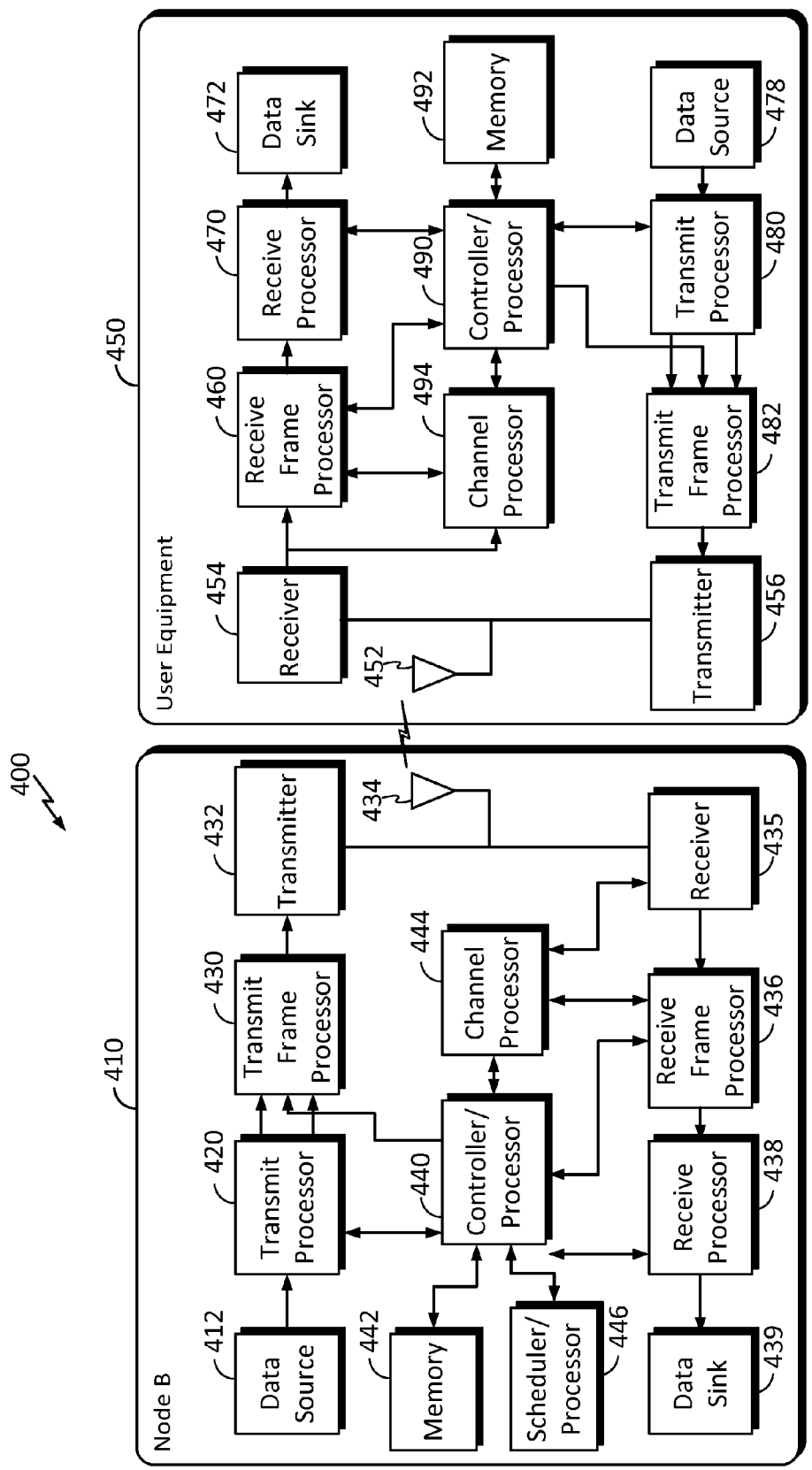
FIG. 4 is a conceptual diagram illustrating an example of a Node B in communication with a user equipment (UE) in a telecommunications system in accordance with aspects of the disclosure.

FIG. 4 is a block diagram of an exemplary Node B 410 in communication with an exemplary UE 450, where the Node B 410 may be the Node B 108 in FIG. 1, and the UE 450 may be the UE 110 in FIG. 1. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable storage media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs. In various aspects, the UE 450 is capable of communicating with the Node B 410 in enhanced UMTS protocols such as HSDPA, HSUPA (EUL), HSPA, or HSPA+.

Figure 5:
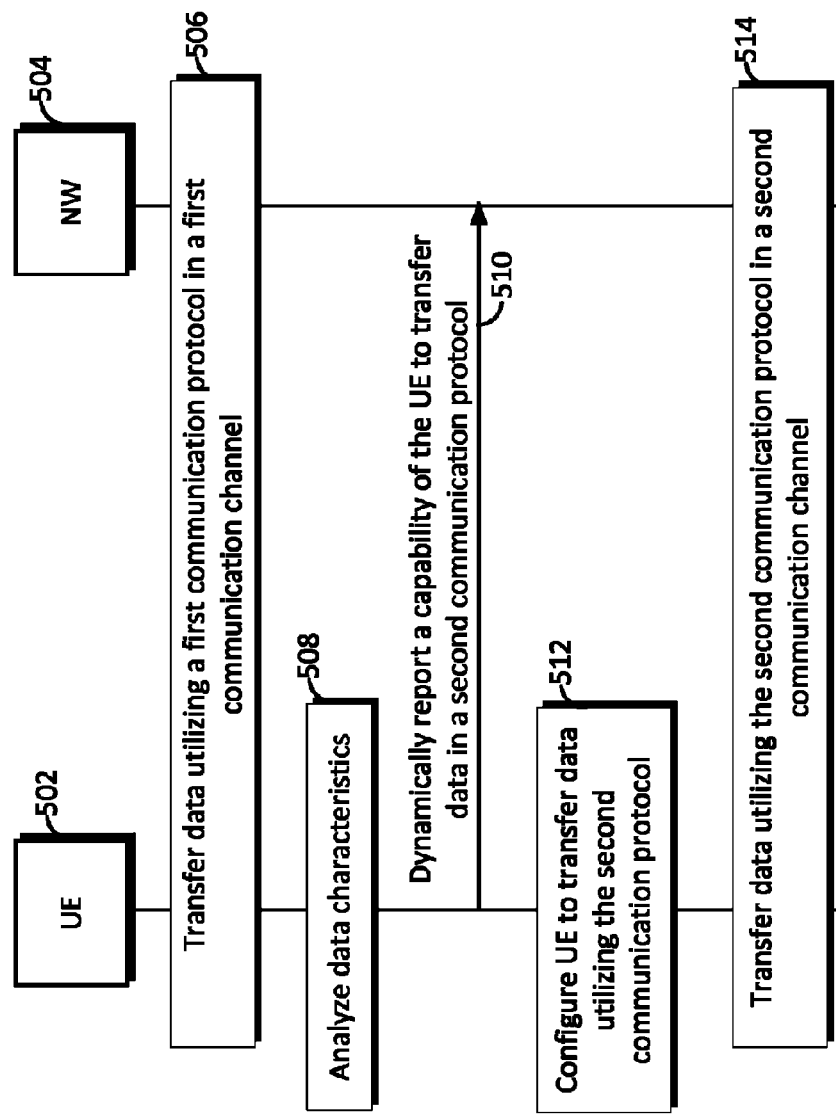
FIG. 5 is a conceptual message flow diagram illustrating a UE dynamically reporting its data communication capability to a network based on characteristics of data in accordance with aspects of the disclosure.

FIG. 5 is a conceptual diagram illustrating a UE 502 dynamically reporting its data communication capability to a network (NW) 504 in accordance with an aspect of the disclosure. The UE 502 may be any of the UEs in FIG. 2, and the network 504 may be the RAN 200. The UE 502 is capable of communicating data with the network 504 utilizing a number of communication protocols or standards such as UMTS Release 99, HSPA, HSDPA, HSUPA, HSPA+, LTE, etc. In various aspects of this disclosure, a UE has enhanced data communication capability when the UE can transfer data utilizing any one of the HSPA, HSDPA, HSUPA, HSPA+, LTE standards, and any other communication standards thereafter. However, the present disclosure is not limited to the disclosed wireless communication standards. The inventive concepts of the present disclosure may be applied to any UE that can support multiple communication standards with different data communication capabilities and maximum throughputs.

If the UE 502 reports its enhanced data capability to the network 504, the network will configure its hardware and/or software resources to communicate with the UE 502 in an enhanced mode for better performance in terms of data throughput. For example, the UE 502 may utilize an Enhanced Dedicated Channel (E-DCH) in the HSPA standards to achieve higher data throughput in the enhanced mode. Although the UE 502 and network 504 can exchange data more quickly using the enhanced capability, the improvement in data throughput may degrade the UE's energy efficiency especially when the total amount of data transferred is reasonably small (e.g., less than 500 bits, 500 kbits, or any desired value). In one example, the UE 502 may initially transfer data with the network 504 utilizing a first communication protocol (e.g., UMTS Release 99) in a first communication channel (e.g., a dedicated transport channel (DCH) or a forward access channel (FCH)) (block 506). In this case, the first communication protocol is not the UE's best data capability, but the UE may have better energy efficiency for the small amount of data transferred using the first communication protocol.

The UE 502 analyzes the data characteristics (block 508) of the data received (e.g., downlink data) and/or data to be transmitted (e.g., uplink data) such that the UE 502 may determine which communication protocol (e.g., UMTS Release 99 or HSPA) should be utilized to achieve the desired balance of energy efficiency and data throughput. The data characteristics that are analyzed by the UE will be described in more detail below. In an aspect of the disclosure, the UE 502 may report its data communication capability using radio resource control (RRC) configuration parameters. Once the network 504 receives the UE capability report, the network 504 may consider the reported UE capability when configuring the radio bearers (RBs) or network grant.

When the UE's enhanced data capability (e.g., HSPA) is utilized, data may be quickly transferred (UL and/or DL data) between the UE 502 and the network 504 assuming good radio conditions and sufficient grant from the network. However, utilizing the enhanced data capability can lead to configuration or deconfiguration of various hardware blocks or circuitries of the UE. For example, the UE may enable/disable diversity receiver or receivers with more advanced interference cancellation and equalization functions. In one example, the hardware blocks or circuitries may be related to HSDPA specific circuitry for decoding the High-Speed Shared Control Channel (HS-SCCH) and Physical Downlink Shared Control Channel (PDSCH), EUL specific circuitry for encoding the transport blocks, and operations including Hybrid Automatic Repeat Request (HARQ) level buffer management in DL data as well as UL data and associated memory usage. In some examples, the hardware blocks or circuitries may be related to the data movers and associated bus bandwidth. In addition, higher clock speed at system level may be used to support the enhanced data capability.

In a further example, when the UE 502 is configured to utilize the HSDPA/EUL protocol, configuration of HSDPA/EUL channels (communication channels) will take considerable amount of time in terms of the physical layer CPHY-primitives, MAC layer CMAC-primitives and RLC layer CRLC-primitives handling procedures as well as software/firmware (SW/FW) interactions to ensure the channel configuration is in the right order. Also, deconfiguration of the HSDPA/EUL channels will take some time in terms of tearing down the channels and transitioning back to the FACH/Idle state in the UMTS Release 99 mode. Therefore, if the UE 502 has a small amount of data (e.g., about 500 bytes or less) to transmit in the UL direction, it may not be energy efficient to configure and allocate enhanced (e.g., HSPA or EUL) channels to transmit the small amount of data. Considering the number of data blocks and number of transmission time intervals (TTIs) that will be used to send the small amount of data, the above-described configuration/deconfiguration overheads (e.g., switching between HSPA and UMTS Release 99) as well as system level HW/SW/FW utilized along with higher clock rate, it may be undesirable to use the enhanced data capability in terms of energy efficiency in consideration of the amount of data transferred.

In some cases, it will be more beneficial to utilize the UE's enhanced data capability when the UE has sufficiently large amount of data traffic with the network. For example, the amount of data can span across multiple TTIs in the UL and/or DL direction such as a large file transfer or video upload/download. Such strategic use of the enhanced data capacity at the UE can balance the gains in higher data throughput and the additional configuration/deconfiguration overheads described above. For certain types of UEs (e.g., machine-to-machine type), the energy efficiency of the UE may be more important than the data latency, considering the data activity as well as QoS requirements. In these types of UEs, data transmission utilizing enhanced capability may lead to undesirably high energy consumption.

Referring back to FIG. 5, the UE 502 dynamically reports its capability to communicate in a second communication protocol with enhanced data capability based on the characteristics of the data transferred or to be transferred (block 510). Further, the UE configures its corresponding hardware or circuitries to transfer data in the second communication protocol (block 512). In addition, the UE may deconfigure or reconfigure the circuitries that are no longer needed to transfer data in the first communication protocol. Then, the UE may transfer data utilizing the second communication protocol in a second communication channel (e.g., HS data channels) (block 514). In one aspect of the disclosure, the UE may report its capability to communicate in the second communication protocol if the energy efficiency will be equal to or greater than a desired energy efficiency threshold (e.g., a predetermined threshold); otherwise, the UE may report its capability to communicate in the first communication protocol if the energy efficiency will be less than the desired energy efficiency threshold.

In another aspect of the disclosure, when the UE is transferring data utilizing the second communication protocol, the UE continues to analyze data characteristics to determine when it is appropriate to switch back to the first communication protocol in consideration of data characteristics and/or its energy efficiency of transferring data in either one of the communication protocols. For example, when the UE expects only a small amount of UL and/or DL data traffic, it may revert back to utilizing the first communication protocol.

Figure 6:
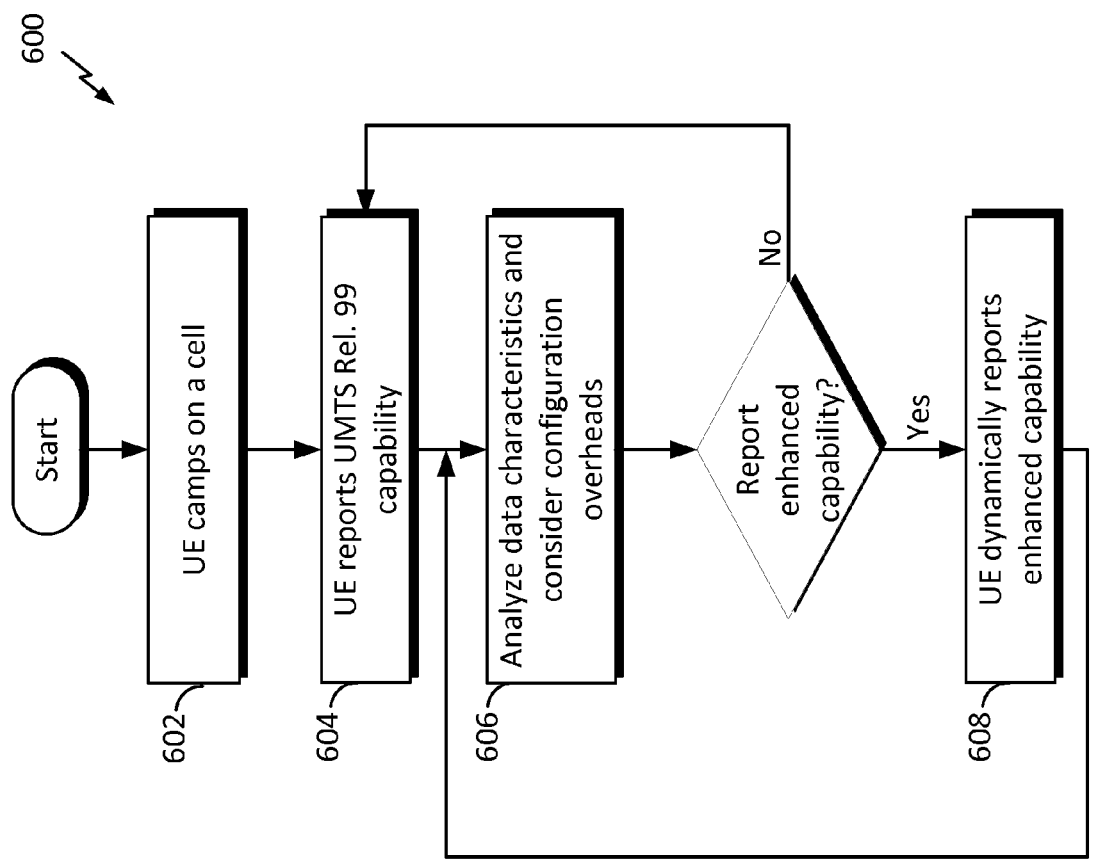
FIG. 6 is a flowchart conceptually illustrating a procedure for dynamically reporting data communication capability based on characteristics of data in accordance with aspects of the disclosure.

FIG. 6 is a flowchart conceptually illustrating a procedure 600 operable at a UE to dynamically report data communication capability based on data characteristics in accordance with aspects of the disclosure. The data characteristics may include the activity, significance, and/or type of the data. In an aspect of the disclosure, the procedure 600 may be performed by the UE 502 that supports the UMTS standards. In the UMTS Release 99 standard, the two basic operational modes of a UE are idle mode and connected mode. After the UE is switched on, it will be in the idle mode and selects a public land mobile network (PLMN) to connect, e.g., RAN 200. The UE searches for a suitable cell of the chosen PLMN, chooses that cell to provide available services, and tunes to its control channels. This process is generally known as "camping on a cell."

Referring to FIG. 6, in block 602, the UE camps on a cell that supports the UMTS Release 99 protocol and an enhanced data access protocol (e.g., HSDPA, EUL, HSPA, HSPA+, LTE, etc.). After camped on the cell, the UE may initially report its capability as being UMTS Release 99 (block 604), or any other capability that is not its best capability. Here, the UE may stay in a Forward Access Channel (FACH) mode for transferring data with the network (e.g., see block 506). While transferring data in the UMTS Release 99 mode, the UE analyzes data characteristics (e.g., DL data and/or UL data) and considers the configuration overheads for configuring the UE to communicate with its enhanced data capability (block 606). When the data characteristics meet certain conditions to be described in detail below, the UE may report its enhanced data capability (e.g., HSPA, HSPA+, or LTE) to the network (block 608); otherwise, it may continue to report its UMTS Release 99 capability (block 604). For example, in consideration of the configuration and/or deconfiguration overheads of the UE to transfer data in the enhanced communication protocol, the UE may report a suitable capability to achieve a desired balance of energy efficiency and data throughput by transmitting RRC configuration parameters to the network. More details of the RRC configuration parameters can be found in the 3GPP Technical Specification 25.331, which is incorporated herein by reference.

Figure 7:
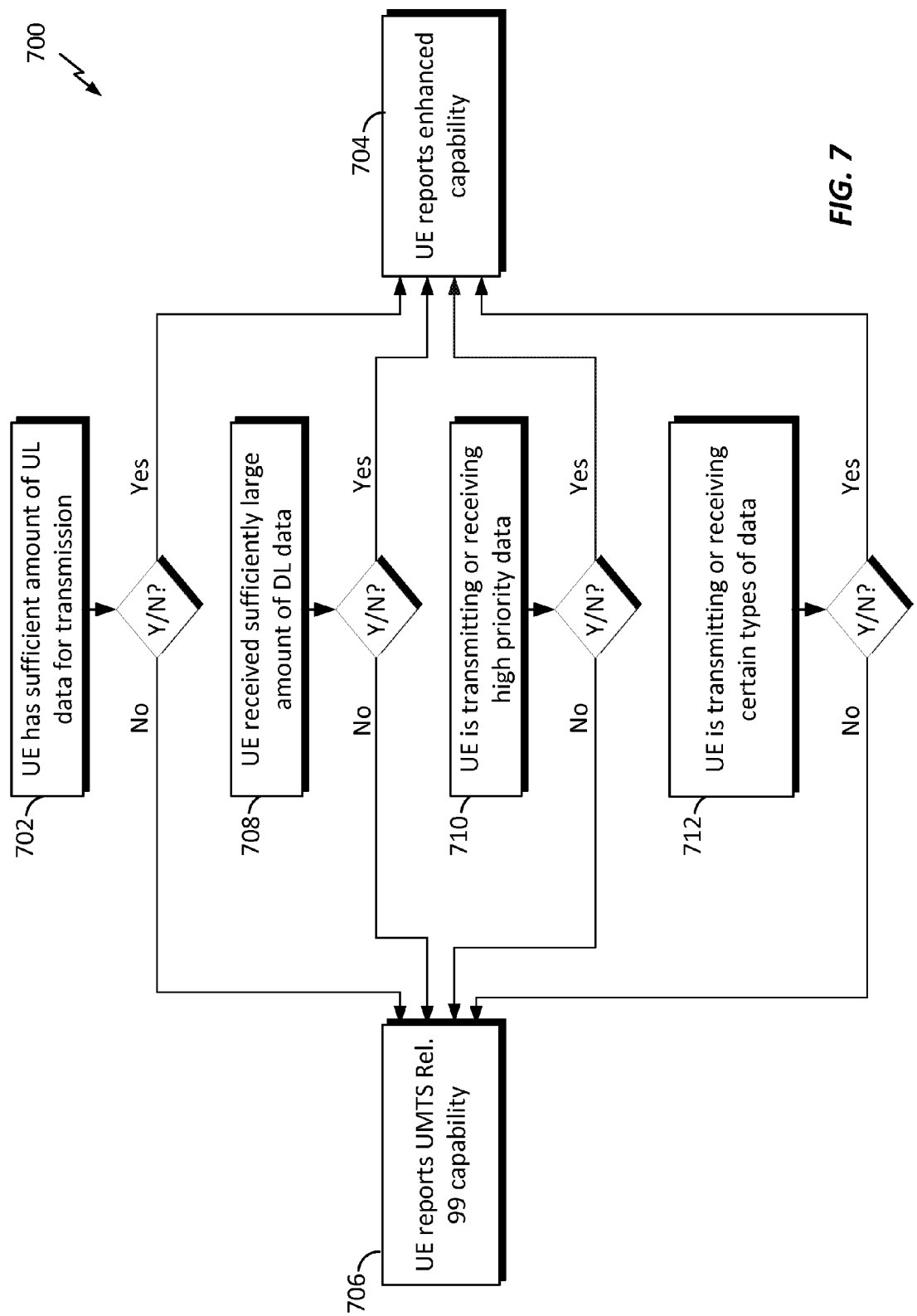
FIG. 7 is a flowchart conceptual illustrating a procedure for analyzing UE data characteristics to dynamically report UE data communication capability in accordance with aspects of the disclosure.

FIG. 7 is a conceptual diagram illustrating a procedure 700 for analyzing data characteristics to dynamically report UE data communication capability in accordance with aspects of the disclosure. This procedure 700 may be performed by a UE 502 in block 508 of FIG. 5 and block 606 of FIG. 6. By way of example and not limitation, it is assumed that the UE initially reports its capability as being UMTS Release 99. In a first scenario, if the UE has a sufficiently large amount of UL data for transmission (e.g., above a threshold or predetermined amount of data bits (e.g., 500 bits)) (block 702), the UE may report its enhanced data capability (block 704); otherwise, the UE reports UMTS Release 99 capability (block 706). In another scenario, if the UE has received a sufficiently large amount of DL data in a predetermined time period T (e.g., Y bits of data in T milliseconds (block 708), the UE reports its enhanced data capability; otherwise, the UE reports UMTS Release 99 capability. In another scenario, if the UE is either transmitting or receiving data with a certain or predetermined priority (e.g., high priority data) (block 710), the UE reports its enhanced data capability; otherwise, the UE reports UMTS Release 99 capability. In another scenario, if the UE is either transmitting or receiving certain or predetermined types of data (block 712), the UE may report its enhanced data capability; otherwise, the UE reports UMTS Release 99 capability. In one example, the type of data may have a strict QoS requirement or is time critical. In another aspect of the disclosure, when one or more of the conditions in steps 702, 708, 710 and 712 are met, the UE may dynamically report its enhanced data capability in consideration of configuration overheads so as to improve energy efficiency for the amount of data transferred.

In various aspects of the disclosure, the UE dynamically reports its data communication capabilities such that it is operating with the desired energy efficiency whenever it is possible. That is, the UE can optimize or minimize its energy consumption for the amount of data transferred by dynamically reporting its data capabilities as exemplified in FIGS. 5-7 and the corresponding description above. In some applications, this kind of dynamic data capability reporting can help mobile-to-mobile devices reduce energy consumption when the devices are designed to transfer non-critical data.

Figure 8:
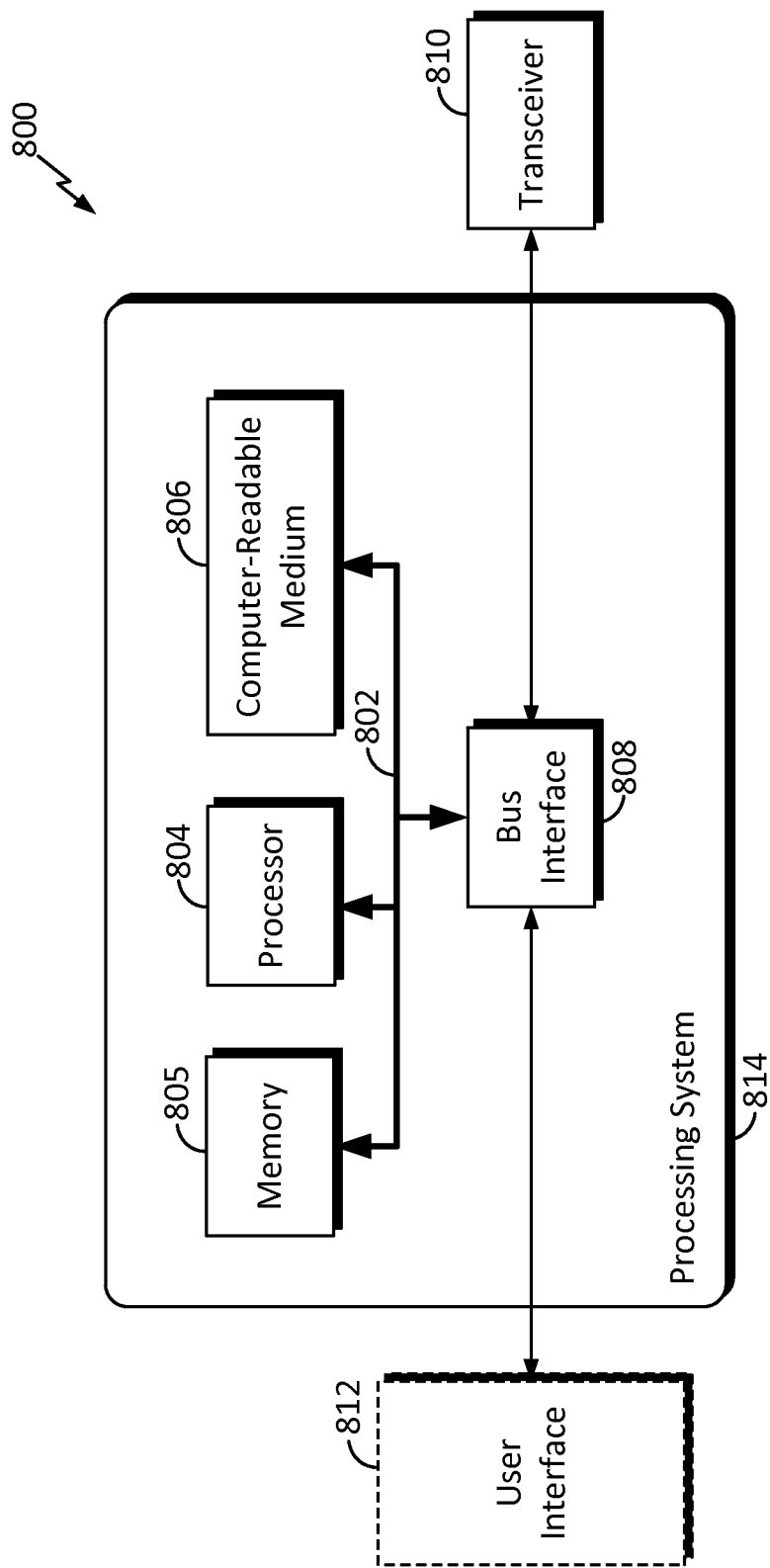
FIG. 8 is a conceptual diagram illustrating an example of a hardware implementation for an apparatus employing a processing system in accordance with an aspect of the disclosure.

FIG. 8 is a conceptual diagram illustrating an example of a hardware implementation for an apparatus 800 employing a processing system 814. In accordance with various aspects of the disclosure, an element, or any portion of an element, or any combination of elements may be implemented with a processing system 814 that includes one or more processors 804. For example, the apparatus 800 may be a user equipment (UE) as illustrated in any one or more of FIGS. 1, 2, 4, and/or 5. In another example, the apparatus 800 may be a radio network controller (RNC) or Node B as illustrated in any one or more of FIGS. 1, 2, 4 and/or 5. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 804, as utilized in an apparatus 800, may be used to implement any one or more of the processes described throughout this specification and illustrated in FIGS. 5-7 and 10.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable storage media (represented generally by the computer-readable storage medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium. Depending upon the nature of the apparatus, a user interface 812 (e.g., keypad, display, speaker, microphone, joystick, touchpad, touchscreen) may also be provided.

The processor 804 may include a number of circuitries that may be configured to perform various functionalities described throughout this specification and illustrated in FIGS. 5-7, for example. In addition, the computer-readable storage medium 806 may include a number of program routines that when executed by the processor 804 can configure the various circuitries of the processor 804 to perform the processes described throughout this specification and illustrated in FIGS. 5-7. The processor 804 and routines stored on the computer-readable storage medium 806 will be described in more detail below.

The processor 804 is responsible for managing the bus 802 and general processing, including the execution of software stored on the computer-readable storage medium 806. The software, when executed by the processor 804, causes the processing system 814 to perform the various functions described infra for any particular apparatus. The computer-readable storage medium 806 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 806. The computer-readable storage medium 806 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium may also include, by way of example, a carrier wave, a transmission line, and any other suitable medium for transmitting software and/or instructions that may be accessed and read by a computer. The computer-readable storage medium 806 may reside in the processing system 814, external to the processing system 814, or distributed across multiple entities including the processing system 814. The computer-readable storage medium 806 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

Figure 9:
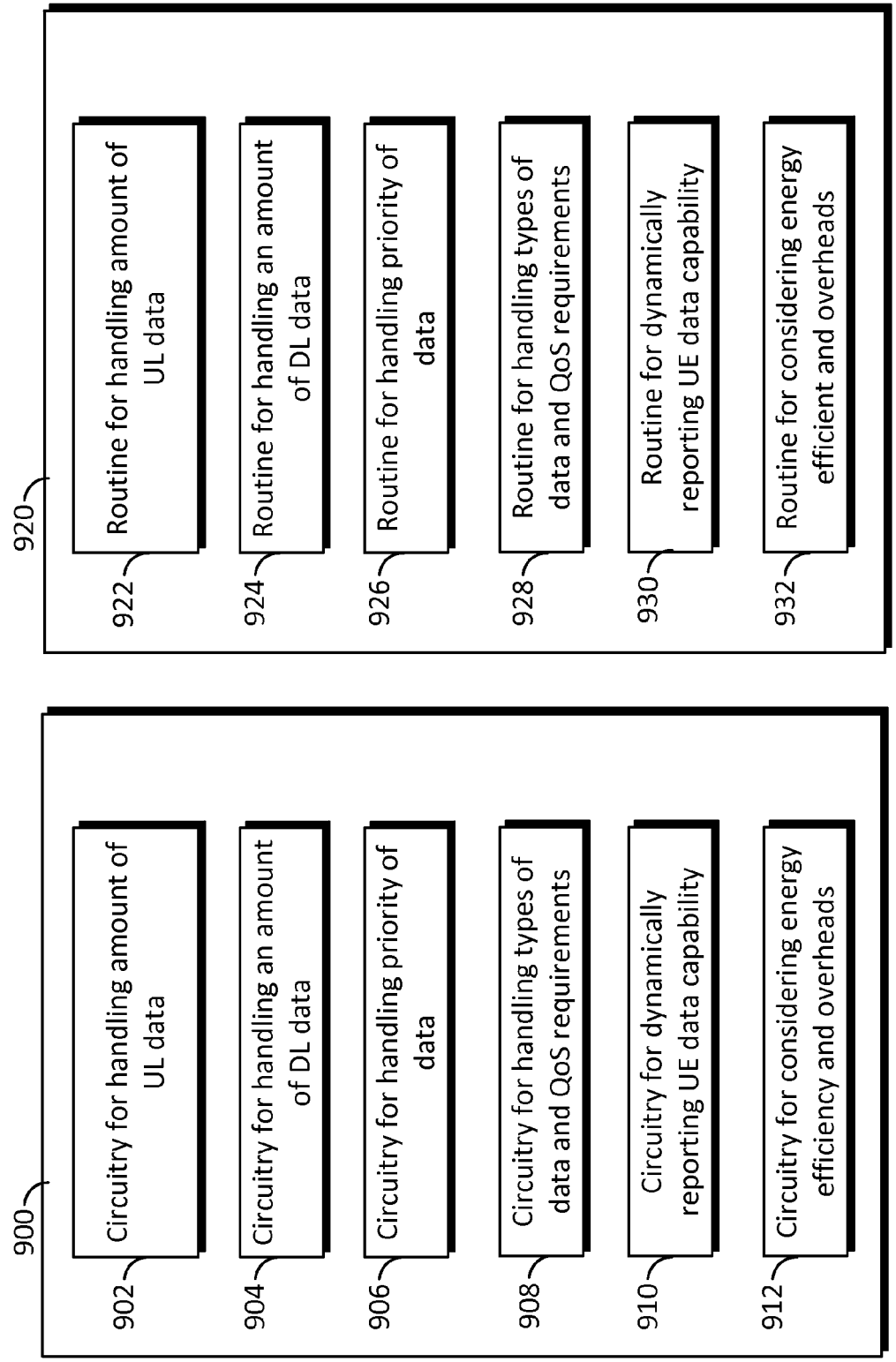
FIG. 9 is a conceptual diagram illustrating a processor and a computer-readable storage medium for dynamically reporting UE data communication capability in accordance with aspects of the disclosure.

FIG. 9 is a conceptual diagram illustrating a processor 900 and a computer-readable storage medium 920 for dynamically reporting UE data communication capability in accordance with aspects of the disclosure. The processor 902 may be the processor 804, and the computer-readable storage medium 920 may be the computer-readable storage medium 806. The processor 902 includes a first circuitry 902 for handling an amount of UL data, a second circuitry 904 for handling an amount of DL data, a third circuitry 906 for handling a priority of data, a fourth circuitry 908 for handling the types of data and QoS requirements, a fifth circuitry 910 for dynamically reporting UE data communication capability, and a sixth circuitry 912 for considering energy efficiency and configuration overheads. These circuitries will be described in more detail below.

The computer-readable storage medium 920 includes a number of software routines that can be executed by the processor 900. In one example, the processor 900 may execute a first routine 922 to configure the first circuitry 902 to handle an amount of UL data that has been transmitted or will be transmitted. In another example, the processor 900 may execute a second routine 924 to configure the second circuitry 904 to handle an amount of DL data that has been received by the UE. In another example, the processor 900 may execute a third routine 926 to configure the third circuitry 906 to handle the priority of data transferred by the UE. In another example, the processor 900 may execute a fourth routine 928 to configure the fourth circuitry 908 to handle the types of data and QoS requirements of the data that has been transferred or will be transferred by the UE. In another example, the processor 900 may execute a fifth routine 930 to configure the fifth circuitry 910 to dynamically report UE data capability based on characteristics of the data such as the amount of UL/DL data, priority, types and/or QoS requirements of the data that are handled by one or more of the first through fourth circuitries (902, 904, 906, and 908). In another example, the processor 900 may execute a sixth routine 932 to configure the sixth circuitry 912 to consider energy efficiency and configuration overheads of the UE in order to determine which UE data communication capability (e.g., UMTS Release 99 or enhanced capability) to report to the network.

In an aspect of the disclosure, the routines 922, 924, 926, and 928 may be executed to perform some or all of the processes illustrated in block 606 of FIG. 6. In an aspect of the disclosure, the routines 930 and 932 may be executed to perform some or all of the processes illustrated in blocks 606 and 608 of FIG. 6.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Figure 10:
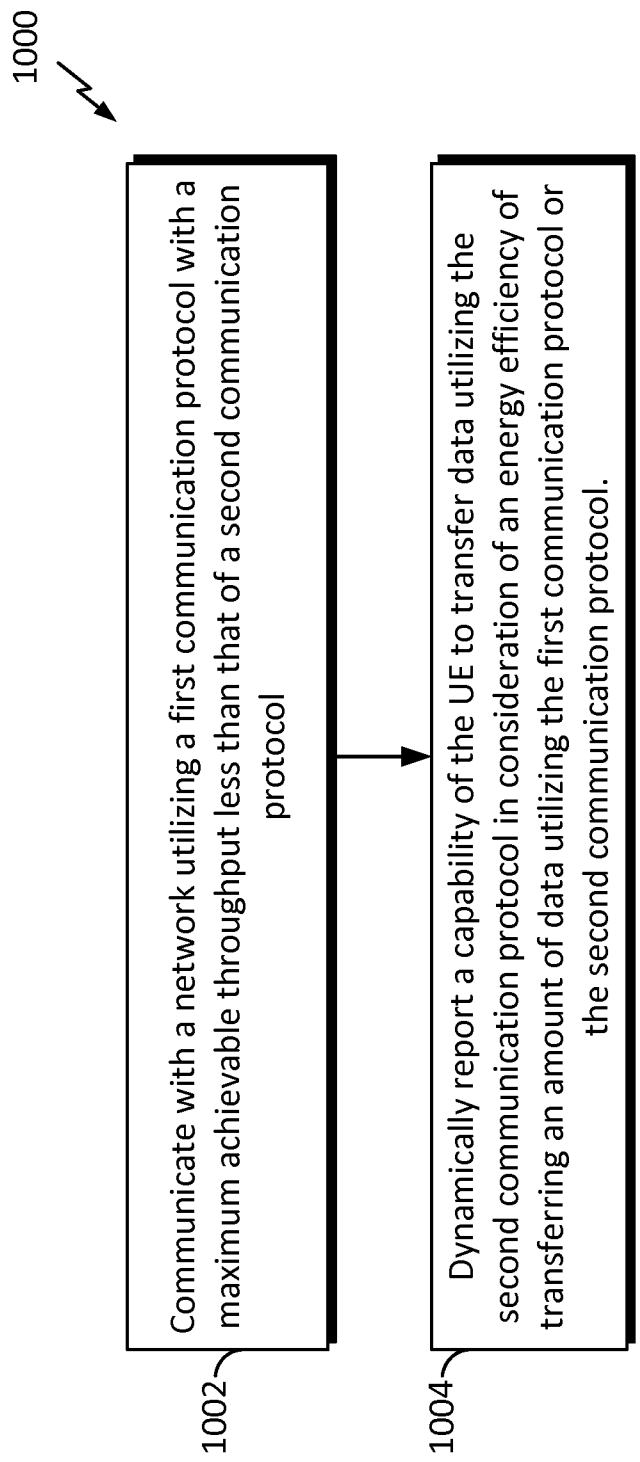
FIG. 10 is a flowchart illustrating a method of dynamically reporting UE data communication capability in a wireless communication system in accordance with an aspect of the disclosure.

FIG. 10 is a flowchart illustrating a method 1000 of dynamically reporting UE data communication capability in a wireless communication system in accordance with an aspect of the disclosure. The method 1000 may be performed by a UE 502. The UE is configured to communicate with a network 504 utilizing a plurality of communication protocols including a first communication protocol and a second communication protocol. The UE may initially communicate with the network utilizing the first communication protocol with a maximum achievable throughput less than that of the second communication protocol (block 1002). For example, the UE may initially transfer data with the network utilizing a UMTS Release 99 protocol (e.g., see block 506 in FIG. 5). In addition, the UE dynamically reports a capability of the UE to transfer data utilizing the second communication protocol in consideration of an energy efficiency of transferring an amount of data utilizing the first communication protocol or the second communication protocol (block 1004). For example, the UE analyzes data characteristics (e.g., block 508 in FIG. 5) and configuration overheads (e.g., block 606 in FIG. 6), and dynamically reports a capability of the UE to transfer data in an enhanced protocol (e.g., message 510 in FIG. 5) in consideration of an energy efficiency of transferring an amount of data utilizing UMTS Release 99 or enhanced capability.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE), the method comprising:
   camping on a cell that supports a first communication protocol and a second communication protocol and initially reporting a capability of the UE to communicate with the cell utilizing the first communication protocol with a maximum achievable throughput less than that of the second communication protocol;
   analyzing one or more characteristics of uplink data or downlink data to determine an energy efficiency based on a configuration overhead for configuring the UE to switch between the first communication protocol and the second communication protocol, to transfer an amount of data utilizing the first communication protocol or the second communication protocol; and
   dynamically reporting the capability of the UE to transfer data utilizing the first communication protocol or the second communication protocol based on the energy efficiency to transfer the amount of data utilizing the first communication protocol or the second communication protocol.

2. The method of claim 1, wherein for dynamically reporting the capability of the UE:
- if the energy efficiency is equal to or greater than a predetermined threshold, reporting the capability of the UE to transfer data in the second communication protocol, and
- if the energy efficiency is less than the predetermined threshold, reporting the capability of the UE to transfer data in the first communication protocol.

3. The method of claim 1, wherein the dynamically reporting is further based on a configuration overhead for configuring circuitry of the UE to transfer data in the first communication protocol or the second communication protocol.

4. The method of claim 1, wherein the dynamically reporting is further based on a configuration overhead for configuring or deconfiguring one or more communication channels for transferring data in the first communication protocol or the second communication protocol.

5. The method of claim 1, wherein the one or more characteristics of the data comprise an amount of the uplink data or downlink data in a predetermined period of time.

6. The method of claim 1, wherein the one or more characteristics of the data comprise a priority of the uplink data or downlink data.

7. The method of claim 1, wherein the one or more characteristics of the data comprise a data type or a quality of service requirement of the uplink data or downlink data.

8. The method of claim 1, wherein the first communication protocol comprises a UMTS Release 99 protocol, and the second communication protocol comprises at least one of an HSDPA, HSUPA, HSPA, HSPA+, EUL, or LTE protocol.

9. An apparatus for wireless communication, the apparatus comprising:
- means for camping on a cell that supports a first communication protocol and a second communication protocol and initially reporting a capability of the apparatus to communicate with the cell utilizing the first communication protocol with a maximum achievable throughput less than that of the second communication protocol;
- means for analyzing one or more characteristics of uplink data or downlink data to determine an energy efficiency based on a configuration overhead for configuring the apparatus to switch between the first communication protocol and the second communication protocol, to transfer an amount of data utilizing the first communication protocol or the second communication protocol; and
- means for dynamically reporting the capability of the apparatus to transfer data utilizing the first communication protocol or the second communication protocol based on the energy efficiency to transfer the amount of data utilizing the first communication protocol or the second communication protocol.

10. The apparatus of claim 9, wherein the means for dynamically reporting the capability of the apparatus is configured to:
- if the energy efficiency is equal to or greater than a predetermined threshold, report the capability of the apparatus to transfer data in the second communication protocol, and
- if the energy efficiency is less than the predetermined threshold, report the capability of the apparatus to transfer data in the first communication protocol.

11. The apparatus of claim 9, wherein the means for dynamically reporting is further configured to base on a configuration overhead for configuring circuitry of the apparatus to transfer data in the first communication protocol or the second communication protocol.

12. The apparatus of claim 9, wherein the means for dynamically reporting is further configured to base on a configuration overhead for configuring or deconfiguring one or more communication channels for transferring data in the first communication protocol or the second communication protocol.

13. The apparatus of claim 9, wherein the one or more characteristics of the data comprise an amount of the uplink data or downlink data in a predetermined period of time.

14. The apparatus of claim 9, wherein the one or more characteristics of the data comprise a priority of the uplink data or downlink data.

15. The apparatus of claim 9, wherein the one or more characteristics of the data comprise a data type or a quality of service requirement of the uplink data or downlink data.

16. The apparatus of claim 9, wherein the first communication protocol comprises a UMTS Release 99 protocol, and the second communication protocol comprises at least one of an HSDPA, HSUPA, HSPA, HSPA+, EUL, or LTE protocol.

17. A computer program product, comprising:
- a non-transitory computer-readable storage medium comprising code for causing a user equipment (UE) to:
  - camp on a cell that supports a first communication protocol and a second communication protocol and initially report a capability of the UE to communicate with the cell utilizing the first communication protocol with a maximum achievable throughput less than that of the second communication protocol;
  - analyze one or more characteristics of uplink data or downlink data to determine an energy efficiency based on a configuration overhead for configuring the UE to switch between the first communication protocol and the second communication protocol, to transfer an amount of data utilizing the first communication protocol or the second communication protocol; and
  - dynamically report the capability of the UE to transfer data utilizing the first communication protocol or the second communication protocol based on the energy efficiency of the UE to transfer the amount of data utilizing the first communication protocol or the second communication protocol, and a configuration overhead for configuring the UE to switch between the first communication protocol and the second communication protocol.

18. The computer program product of claim 17, wherein for dynamically reporting the capability of the UE, the code further causes the UE to:
- if the energy efficiency is equal to or greater than a predetermined threshold, report the capability of the UE to transfer data in the second communication protocol, and
- if the energy efficiency is less than the predetermined threshold, report the capability of the UE to transfer data in the first communication protocol.

19. The computer program product of claim 17, wherein the code causes the UE to dynamically report the capability further based on a configuration overhead for configuring circuitry of the UE to transfer data in the first communication protocol or the second communication protocol.

20. The computer program product of claim 17, wherein the code causes the UE to dynamically report the capability further based on a configuration overhead for configuring or deconfiguring one or more communication channels for transferring data in the first communication protocol or the second communication protocol.

21. The computer program product of claim 17, wherein the one or more characteristics of the data comprise an amount of the uplink data or downlink data in a predetermined period of time.

22. The computer program product of claim 17, wherein the one or more characteristics of the data comprise a priority of the uplink data or downlink data.

23. The computer program product of claim 17, wherein the one or more characteristics of the data comprise a data type or a quality of service requirement of the uplink data or downlink data.

24. The computer program product of claim 17, wherein the first communication protocol comprises a UMTS Release 99 protocol, and the second communication protocol comprises at least one of an HSDPA, HSUPA, HSPA, HSPA+, EUL, or LTE protocol.

25. An apparatus for wireless communication, comprising:
at least one processor;
a communication interface coupled to the at least one processor; and
a memory coupled to the at least one processor,
wherein the at least one processor comprises:
first circuitry configured to camp on a cell that supports a first communication protocol and a second communication protocol and initially report a capability of the apparatus to communicate with the cell utilizing the first communication protocol with a maximum achievable throughput less than that of the second communication protocol; and
second circuitry configured to:
analyze one or more characteristics of uplink data or downlink data to determine an energy efficiency based on a configuration overhead for configuring the apparatus to switch between the first communication protocol and the second communication protocol, to transfer an amount of data utilizing the first communication protocol or the second communication protocol; and dynamically report the capability of the apparatus to transfer data utilizing the first communication protocol or the second communication protocol based on the energy efficiency to transfer the amount of data utilizing the first communication protocol or the second communication protocol, and a configuration overhead for configuring the UE to switch between the first communication protocol and the second communication protocol.

26. The apparatus of claim 25, wherein the second circuitry is further configured to:
if the energy efficiency is equal to or greater than a predetermined threshold, report the capability of the apparatus to transfer data in the second communication protocol, and
if the energy efficiency is less than the predetermined threshold, report the capability of the apparatus to transfer data in the first communication protocol.

27. The apparatus of claim 25, wherein the second circuitry is further configured to dynamically report the capability of the apparatus further based on a configuration overhead for configuring circuitry of the apparatus to transfer data in the first communication protocol or the second communication protocol.

28. The apparatus of claim 25, wherein the second circuitry is further configured to dynamically report the capability of the apparatus further based on a configuration overhead for configuring or deconfiguring one or more communication channels for transferring data in the first communication protocol or the second communication protocol.

29. The apparatus of claim 25, wherein the one or more characteristics of the data comprise an amount of the uplink data or downlink data in a predetermined period of time.

30. The apparatus of claim 25, wherein the one or more characteristics of the data comprise a priority of the uplink data or downlink data.

31. The apparatus of claim 25, wherein the one or more characteristics of the data comprise a data type or a quality of service requirement of the uplink data or downlink data.

32. The apparatus of claim 25, wherein the first communication protocol comprises a UMTS Release 99 protocol, and the second communication protocol comprises at least one of an HSDPA, HSUPA, HSPA, HSPA+, EUL, or LTE protocol.

* * * * *